July 22, 1958     J. P. BUTTERFIELD     2,844,366
SPRING SNUBBER UNIT
Original Filed Oct. 9, 1953
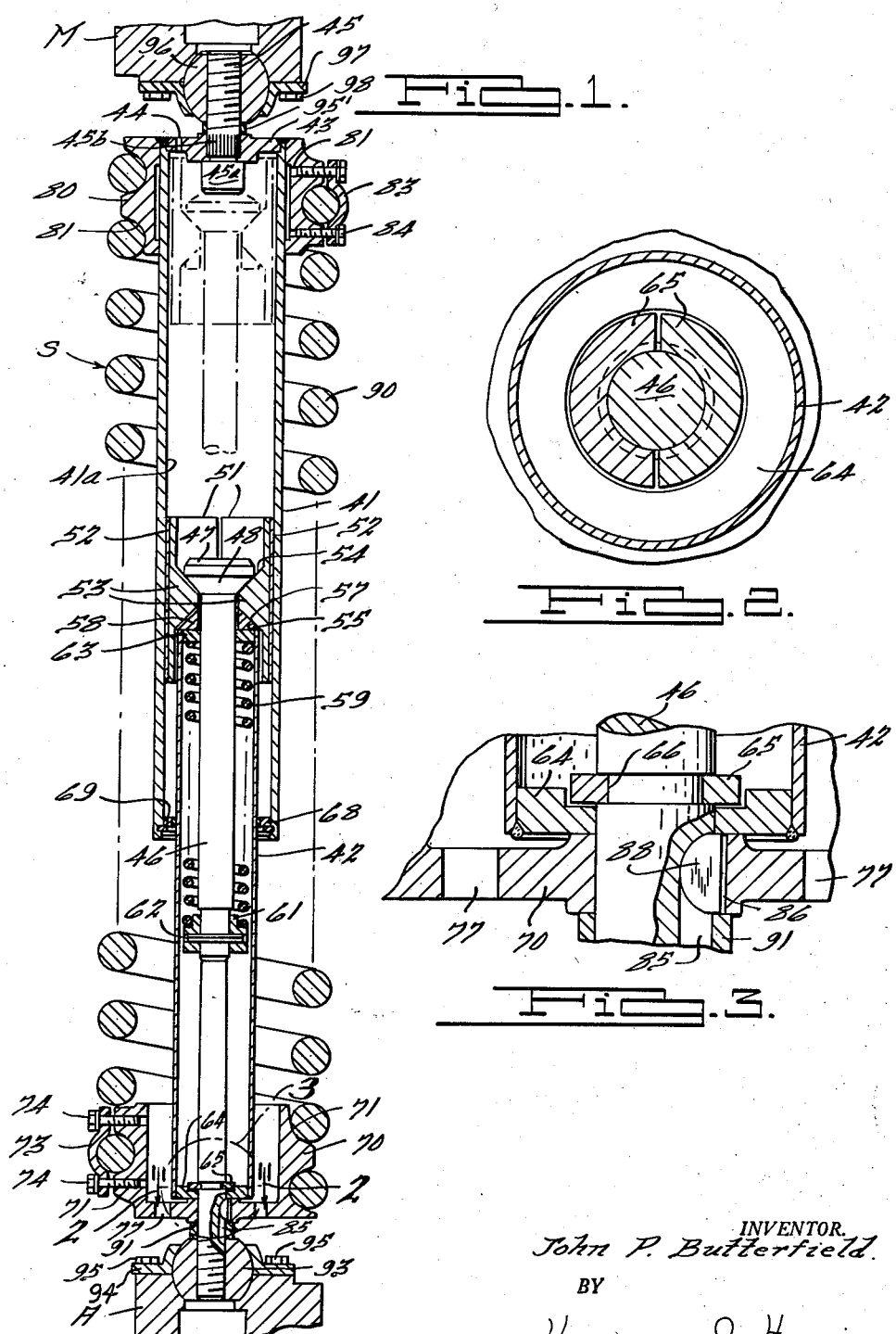
INVENTOR.
John P. Butterfield.
BY
Harness and Harris
ATTORNEYS.

United States Patent Office 2,844,366
Patented July 22, 1958

2,844,366

SPRING SNUBBER UNIT

John P. Butterfield, Grosse Pointe Park, Mich., assignor to Chrysler Corporation, Highland Park, Mich., a corporation of Delaware Original application October 9, 1953, Serial No. 385,249. Divided and this application August 18, 1954, Serial No. 450,766

2 Claims. (Cl. 267—1)

This invention relates to spring-snubber units and is directed particularly to a spring-snubber unit adapted to resiliently support an object in tension and compression, said snubber unit including a relatively constant force friction damping means that isolates the spring snubber supported object from vibration while protecting it from shock.

It is still another object of this invention to provide an improved form of combination spring-snubber unit that is relatively simple in design, economical to manufacture and install, durable in construction and reliable in operation over a very wide temperature range.

Other objects of this invention will become readily apparent from a reading of the following description and a consideration of the related drawings wherein:

Fig. 1 is an enlarged sectional elevational view of a spring-snubber unit embodying this invention;

Fig. 2 is an enlarged fragmentary, sectional elevational view taken on the lines 2—2 of Fig. 1; and Fig. 3 is an enlarged, fragmentary, sectional elevational view of that portion of the lower end of the spring-snubber unit that is within the circle 3 of Fig. 1.

The invention disclosed and claimed in this application is a division of the invention originally disclosed and claimed in the parent application of John P. Butterfield, Serial No. 385,249, filed October 9, 1953, now Patent Number 2,817,435, dated December 24, 1957.

The drawings show at A a support to which a spring snubber unit S is attached at one of its ends with the other end of the spring snubber unit connected to an article M which is adapted to have its movement controlled by the spring snubber unit S. The spring snubber unit is adapted to act in both tension and compression and includes damping means to damp out vibrations of the resiliently suspended article M. The spring-snubber unit S comprises an outer tube-like barrel 41 and an inner, telescopically arranged, tube-like barrel 42. The upper end of the outer barrel 41 is closed by a plug 43. Plug 43 is pierced by an air vent bore 44 and has its center portion pierced by an opening that receives the threaded stud 45. The stud 45 has an enlarged head portion 45a, located within the barrel 41, that provides a stop for the reciprocable plunger rod 46 in one of its limiting positions. This limiting position is indicated by the broken lines in Fig. 1. The threaded shank of the stud 45 is formed along a portion of its length with serrations 45b that are adapted to be fixedly engaged with the encircling portions of the plug 43 to prevent relative rotation between the stud 45 and the plug 43. The plug 43 is fixedly connected to the upper end of the outer barrel 41 by welding or any equivalent type of connection.

Mounted in and extending axially of the outer barrel 41 is the plunger rod 46. Plunger rod 46 has an enlarged head portion 47 at its upper end that is formed with a plurality of flat, radially extending, beveled, wedging faces 48. The purpose of these wedging faces 48 will become readily apparent from the following description.

Encircling the headed end 47 of the plunger rod 46 and arranged concentrically within the outer barrel 41 are a plurality of friction shoes 51. Each of these sleeve-type shoes 51 has an outer surface that is a segment of a cylinder shaped to matingly fit the arcuate inner wall 41a of the outer barrel 41. Shoes 51 each have their outer surfaces lined with a suitable friction material 52 that may be similar to conventional friction brake band or clutch disc material. Projecting radially inwardly from the inner or concave surface of each of the sleeve type friction shoes 51 is a double face wedge ramp 53. Each ramp 53 has a pair of flat, converging ramp surfaces 54 and 55 respectively. The upper ramp surface 54 of each of the shoe ramps 53 is shaped to be engaged in face-to-face contact with one of the wedging faces 48 formed on the headed end 47 of the plunger rod 46. The lower ramp surface 55 of each of the shoe ramps 53 is shaped to be engaged in face-to-face contact with beveled upper surface 57 of the washer-like wedge ring 58. Wedge ring 58 is slidably mounted on the plunger rod 46 so that it may be pressed into engagement with the shoe wedge ramp surfaces 55 by the precompressed coil spring 59.

The coil spring 59, that is threaded around the plunger rod 46, is maintained in a precompressed state by the washer-like collar 61 that is fixedly connected to the plunger rod 46 by the pin 62. The upper end of the compressed spring 59 bears against a thrust washer 63 that is floatingly mounted on the plunger rod 46. Due to the high degree of precompression of the spring 59 the friction shoes 51 are continually forced radially outwardly against the inner surface 41a of the outer barrel 41 with a substantially constant force irrespective of variation in the load applied to the spring-snubber unit S. This friction vibration damping force remains substantially constant due to the fact that the usual forces that are applied to the spring-snubber unit S are not sufficient to cause additional compression of the precompressed spring 59. The manner of mounting the spring 59 on the plunger rod 46 maintains the precompression of the spring 59 regardless of the loading applied to the spring-snubber unit S.

Encircling the lower portion of the plunger rod 46 and the precompressed spring 59 is the inner barrel 42. This inner barrel 42 has its lower end fixedly connected to the outer periphery of a washer element 64 (see Fig. 3) by a weld connection. The barrel mounted washer element 64 is also anchored to the lower end of the plunger rod 46 by means of the split ring washer 65 (see Figs. 2 and 3) and by the cup-like collar 70. The mounting of the collar 70 in rod 46 will be subsequently described.

The plunger rod 46 is provided with a reduced neck portion 66 (see Fig. 3) to receive the split washer 65. Washer 65 thus prevents movement of the inner barrel 42 axially of the plunger rod in a direction towards the headed end 47 of the plunger rod 46. As will be evident from a consideration of Fig. 1 and from the subsequent description, the collar 70 prevents movement of the inner barrel 42 in the opposite axial direction. The upper end of the inner barrel 42 is designed to encircle and bear against the thrust washer 63 at the upper end of the spring 59. It will be noted that washer 63 is not fixedly connected to the upper end of the inner barrel 42 but merely matingly fits within the barrel 42 to act as a guide ring therefor. The lower end of the outer barrel 41 is provided along its inner surface with a washer-like guide ring 68 (see Fig. 1). This guide ring 68 may be a bronze bushing or the like and it is anchored in position in the lower end of outer barrel 41 by means of a snap type retainer ring 69. As the guide ring 68 extends between the inner surface 41a of the outer barrel 41 and the outer surface of the inner barrel 42 and the guide ring 63 between the plunger rod 46 and the inner barrel 42, it is thought to be obvious that the guide rings 63, 68 provide means that restrains tilting or buckling of the plunger rod 46 with respect to both the inner and outer barrels 42, 41. This insures that each of the friction shoes 51 will be continuously operable to accomplish its intended vibration damping action.

Encircling the upper end of the outer barrel 41 and fixedly connected thereto by a welded connection, or the like, is a cup-like collar 80. Collar 80 has thread-like depressions 81 formed in its outer side surfaces that are adapted to threadedly receive the upper end turns of a relatively large size load supporting coil spring 90. The thread-like depressions 81 provide a means for transmitting tension and compression forces between the outer barrel 41 and the coil spring 90. To prevent any relative movement between the coil spring 90 and the collar 80 there is provided a spring anchor clip 83 that is fixed to the collar 80 by the bolts 84. Clip 83 effectively anchors the upper end turns of the spring 90 to the outer side surface of the upper collar 80.

The coil spring 90 extends concentrically about the outer and inner barrels 41, 42 of the spring-snubber unit S and has its lower end turns threadedly mounted in the thread-like depressions 71 formed in the outer side surfaces of the cup-like collar 70. A spring anchor clip 73 is mounted on the collar 70 by means of the bolts 73 and this anchor clip clampingly engages the lower end turns of the coil spring 90 so as to effectively prevent relative movement between these lower end turns and the collar 70. This mounting of the coil spring 90 on the snubber barrels 41 and plunger rod 46 provides a very compact effective unit.

The collar 70 at the lower end of the spring-snubber unit S is fixedly mounted on the lower end of the plunger rod 46 so that it can neither shift axially of the rod 46 nor rotate with respect thereto. The rod 46 is provided with a keyway 85 (see Fig. 3) extending longitudinally of the rod. Collar 70 is provided with a key-receiving groove 86 that is adapted to be aligned with the plunger rod keyway 85. After the keyway 85 and groove 86 have been aligned the key 88 is slidably mounted in the aligned openings 85, 86 from the lower end of the rod 46. The key 88 will then prevent relative rotation between the collar 70 and the rod 46. After mounting of the key 88 in its keyway 85 and key receiving groove 86, the sleeve-like bushing 91 is slipped over the lower end of the rod plunger rod 46 and moved up against the collar 70 so as to cover the keyway 85 and prevent loss of the key 88. Collar 91 also acts as a spacer between the collar 70 and the ball-type nut 93 that is threaded on the lower threaded end of the plunger rod 46.

Ball-type nut 93 is adapted to be received in a suitable mating socket element which may comprise a demountable socket plate 94 that is connectible to a support, such as the container A, by means of the screws 95. Obviously the support member A must be provided with a suitable recess to receive a portion of the ball-type nut 93. The bottom surface of the collar 70 may be pierced by air vent bores 77 to prevent any interference with movement of the lower end of the outer barrel 41 into the cup-like collar 70 on compression of the load supporting spring 90.

The ball and socket construction at the upper end of the spring-snubber unit S is substantially identical to that at the lower end of the unit S. A sleeve-type spacer collar 95' is mounted on the threaded shank of the stud 45 adjacent the outer side of the plug 43. Threaded on the shank of the stud 45 is a ball-type nut 96. A socket plate 97 is removably connected to the ball-type nut 96 by means of the bolts 98. The article M, to which the plate 97 is attached, has a preformed recess to receive a portion of the ball-type nut 96.

It is thought to be obvious that the spring-snubber unit heretofore described provides a coil spring 90 that interconnects the two relatively movable bodies A and M in such a manner as to resiliently support the article M on the body A. The spring 90 can take loads in both tension and compression and thus it isolates the body M from shock. Furthermore, the friction snubber unit within barrel 41 provides a rugged, reliable, damping unit to isolate the spring supported body M from vibration. Not only is the spring-snubber unit S an effective body suspension unit but it is one that is simple, relatively inexpensive, and extremely compact for the job it accomplishes. In addition, it will be noted that, due to the use of friction type damping means, the spring-snubber units S are not susceptible to the difficulties encountered when hydraulic or rubber-like vibration damping means are used in similar devices that may be subjected to wide variations in temperature range.

I claim:

1. A double acting resilient suspension unit comprising a first tubular barrel, a plurality of radially expansible, sleeve-like, friction shoes concentrically mounted in said first barrel and arranged for axial movement relative to said first barrel, wedge-like shoe expander ramp means carried by each of said shoes, a plunger rod extending axially through a portion of said first barrel, said plunger rod having a formation thereon engageable with the wedge-like ramp means on said shoes, a wedge element movably mounted on said rod having a ramp portion engageable with the wedge-like ramp means on said shoes so as to sandwich the shoe ramps between said formation on said plunger rod and said wedge element, a floating guide washer surrounding said rod adjacent said wedge element, a precompressed spring carried by said rod having an end thereof reacting against said floating guide washer, said spring continuously applying a force to said wedge element to radially expand said friction shoes into engagement with the inner surface of said barrel with a substantially constant force irrespective of the load normally applied to the suspension unit, means carried by the plunger rod to provide for the connection of said rod to a first member, means carried by said first barrel to provide for the connection of said first barrel to a second member and guide means extending between said first barrel and said plunger rod to rigidly resist rocking movement of said first barrel relative to said plunger rod, said guide means comprising a second barrel fixedly connected to and surrounding said plunger rod and arranged concentrically within and contiguous to said first barrel for axial movement relative thereto, said second barrel having an end portion thereof guidingly engaged with said floating guide washer, annular bearing means, spaced axially from the floating guide washer, extending between said first and second barrels and sealing off the space therebetween against entrance of foreign matter, said floating guide washer and annular bearing means cooperating with said barrels to rigidly resist relative axial rocking between the plunger rod and said first barrel, and load supporting resilient means connected between said plunger rod and said first barrel.

2. A double acting resilient suspension unit comprising a first tubular barrel, a plurality of radially expansible, sleeve-like, friction shoes concentrically mounted in said barrel and arranged for axial movement relative to the first barrel, each shoe having an outer arcuately shaped portion adapted to be frictionally engaged with the interior surface of said first barrel and an inner surface formed with a pair of radially extending, converging, inwardly directed, ramp surfaces, a plunger rod extending axially through a portion of said first barrel, said plunger rod having a formation thereon providing a wedge surface engageable with one of the ramp surfaces on each of said shoes, a wedge ring encircling and movably mounted on said rod having a ramp face engageable with the other ramp surface on each of said shoes so as to sandwich the shoe ramp surfaces between said wedge formation on said plunger rod and said wedge ring, a floating guide washer slidably and guidingly mounted on said plunger rod and arranged adjacent said wedge ring, a compressed spring encircling and carried by said rod having an end thereof reacting against said floating guide washer, said spring being arranged on said rod to continuously apply a force to said wedge ring to urge said wedge ring against the other one of the ramp surfaces on each shoe to radially expand said friction shoes into engagement with the interior surface of said first barrel with a substantially constant force irrespective of the loads normally applied to said suspension unit, means carried by the plunger rod to provide for the connection of said rod to a first member, means carried by the first barrel to provide for the connection of said first barrel to a second member, a first sleeve-like member fixedly connected to and arranged concentrically about a portion of said plunger rod, said first sleeve-like member having thread-like depressions in its outer surface adapted to receive the turns of a coil spring, a second sleeve-like member fixedly connected to and arranged concentrically about a portion of said first barrel, said second sleeve-like member having thread-like depressions in its outer surface adapted to receive the turns of a coil spring, a coil spring arranged concentrically about said first barrel and said rod having opposite end turns thereof anchored in the thread-like depressions formed in the outer surfaces of said first and second sleeve-like members, a second barrel surrounding said plunger rod and telescopically engaged with said first barrel for axial movement relative thereto, said second barrel having one end guidingly engaged with said floating guide washer and the other end fixed to said plunger rod, and a guide bearing between said barrels sealing off the space therebetween against the entrance of foreign matter, said guide bearing cooperating with said barrels and guide washer to rigidly resist relative axial rocking between the plunger rod and said first barrel.

References Cited in the file of this patent

UNITED STATES PATENTS

| | | |
|---|---|---|
| 2,237,318 | Snyder | Apr. 8, 1941 |
| 2,574,788 | Janeway et al. | Nov. 13, 1951 |

FOREIGN PATENTS

| | | |
|---|---|---|
| 164,532 | Germany | Nov. 4, 1905 |
| 264,003 | Great Britain | Jan. 13, 1927 |
| 422,686 | Great Britain | Jan. 16, 1935 |
| 843,992 | France | Apr. 11, 1939 |